(12) United States Patent
Mellet et al.

(10) Patent No.: US 9,249,863 B2
(45) Date of Patent: Feb. 2, 2016

(54) DUAL CLUTCH TRANSMISSION

(75) Inventors: Edward W. Mellet, Rochester Hills, MI (US); Scott H. Wittkopp, Ypsilanti, MI (US); Craig S. Ross, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1078 days.

(21) Appl. No.: 12/723,473

(22) Filed: Mar. 12, 2010

(65) Prior Publication Data

US 2010/0269606 A1 Oct. 28, 2010

Related U.S. Application Data

(60) Provisional application No. 61/171,676, filed on Apr. 22, 2009.

(51) Int. Cl.
*F16H 3/08* (2006.01)
*F16H 3/00* (2006.01)
*F16H 3/093* (2006.01)

(52) U.S. Cl.
CPC ........ *F16H 3/006* (2013.01); *F16H 2003/0931* (2013.01); *F16H 2200/0047* (2013.01); *Y10T 74/19228* (2015.01)

(58) Field of Classification Search
CPC ................ F16H 2200/0047; F16H 2003/0931; F16H 3/006
USPC .................................................... 74/331, 330
See application file for complete search history.

(56) References Cited

U.S. PATENT DOCUMENTS

| | | | | |
|---|---|---|---|---|
| 6,209,407 B1 * | 4/2001 | Heinzel et al. | ................... | 74/331 |
| 6,250,171 B1 * | 6/2001 | Sperber et al. | ................... | 74/331 |
| 6,427,547 B1 | 8/2002 | Bowen | | |
| 6,427,549 B1 | 8/2002 | Bowen | | |
| 6,427,550 B1 | 8/2002 | Bowen | | |
| 6,499,370 B2 * | 12/2002 | Bowen | .......... | 74/330 |
| 6,634,247 B2 * | 10/2003 | Pels et al. | .......... | 74/329 |
| 6,969,335 B2 * | 11/2005 | Lorken | ......... | 475/302 |
| 6,973,849 B2 | 12/2005 | Hosono | | |
| 7,004,044 B2 | 2/2006 | Hosono | | |
| 7,258,032 B2 * | 8/2007 | Kim | ............... | 74/330 |
| 7,272,986 B2 | 9/2007 | Janson | | |
| 7,287,442 B2 * | 10/2007 | Gumpoltsberger | ............. | 74/331 |
| 7,464,616 B2 | 12/2008 | Leibbrandt et al. | | |
| 7,798,030 B2 * | 9/2010 | Lang et al. | ................. | 74/331 |
| 7,832,299 B2 * | 11/2010 | Kobayashi et al. | ............. | 74/330 |
| 7,950,302 B2 * | 5/2011 | Burgardt et al. | ................ | 74/331 |
| 8,024,988 B2 * | 9/2011 | Vennemann | .................... | 74/330 |
| 2002/0088288 A1 | 7/2002 | Bowen | | |
| 2002/0088291 A1 | 7/2002 | Bowen | | |

(Continued)

FOREIGN PATENT DOCUMENTS

DE 102005057802 A1 6/2007
EP 1077336 A1 2/2001

(Continued)

*Primary Examiner* — William Kelleher
*Assistant Examiner* — Zakaria Elahmadi (57) ABSTRACT

A transmission includes an input member, an output member, first and second shafts, first and second countershafts, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

5 Claims, 6 Drawing Sheets

(56) References Cited

U.S. PATENT DOCUMENTS

| | | |
|---|---|---|
| 2002/0092372 A1 | 7/2002 | Bowen |
| 2002/0183162 A1 | 12/2002 | Ogawa et al. |
| 2005/0115344 A1* | 6/2005 | Kim et al. ............... 74/331 |
| 2006/0172855 A1* | 8/2006 | Pollak et al. ............ 477/70 |
| 2006/0230853 A1 | 10/2006 | Krauss et al. |
| 2006/0230854 A1 | 10/2006 | Enstrom et al. |
| 2006/0266141 A1* | 11/2006 | Ogami .................... 74/325 |
| 2006/0266144 A1* | 11/2006 | Schafer et al. ........... 74/340 |
| 2007/0131046 A1* | 6/2007 | Borgerson ............... 74/331 |
| 2008/0034905 A1* | 2/2008 | Hatori et al. ............ 74/330 |
| 2008/0134818 A1* | 6/2008 | Gitt ........................ 74/330 |
| 2008/0134819 A1* | 6/2008 | Kapp et al. .............. 74/331 |
| 2008/0196543 A1* | 8/2008 | Kobayashi et al. ...... 74/664 |
| 2008/0202266 A1* | 8/2008 | Hendrickson et al. ... 74/331 |
| 2009/0173175 A1* | 7/2009 | Thery ..................... 74/331 |
| 2010/0319473 A1* | 12/2010 | Singh et al. ............. 74/331 |

FOREIGN PATENT DOCUMENTS

| | | |
|---|---|---|
| EP | 1400731 A2 | 3/2004 |
| WO | WO2006040150 A1 | 4/2006 |

* cited by examiner

DUAL CLUTCH TRANSMISSION

CROSS-REFERENCE TO RELATED APPLICATIONS

This application claims the benefit of U.S. Provisional Application No. 61/171,676, filed on Apr. 22, 2009, which is hereby incorporated in its entirety herein by reference.

TECHNICAL FIELD

The present disclosure relates to transmissions and more particularly to a compact, dual clutch transmission having three axes to establish six gear speeds of which one could be a reverse gear speed.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, first and second countershafts, a plurality of co-planar gear sets and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes between four and six co-planar gear sets.

In yet another aspect of the present invention, the transmission includes four synchronizer assemblies.

In yet another aspect of the present invention, two of the synchronizer assemblies are two-way synchronizers and two of the synchronizer assemblies are one-way synchronizers.

In yet another aspect of the present invention, the transmission includes three synchronizer assemblies.

In yet another aspect of the present invention, the synchronizer assemblies are two-way synchronizers.

In yet another aspect of the present invention, the transmission is operable to provide at least five forward speed ratios.

The above features and advantages and other features and advantages of the present invention are readily apparent from the following detailed description of the best modes for carrying out the invention when taken in connection with the accompanying drawings.

DESCRIPTION

Figure 1:
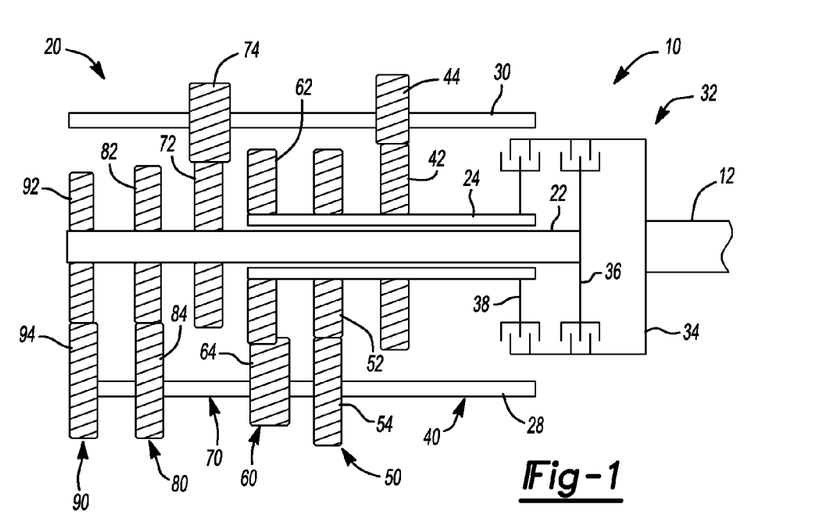
FIG. 1 is a schematic diagram of an embodiment of a five speed transmission, in accordance with the present invention.

Referring to FIG. 1, a multiple speed transmission is generally indicated by reference number 10. The transmission 10 includes an input member 12 and a gearing arrangement 20. The input member 12 may be separate from the transmission 10 and form part of or be connected with a flywheel or other output from an engine (not shown). The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 28 and a second countershaft 30. The second shaft or member 24 is a sleeve shaft that is concentric with and overlies the first shaft or member 22. The first and second countershafts 28, 30 are spaced apart from and parallel with the first and second shaft members 22, 24. Moreover, the first and second countershafts 28, 30 are connectable through additional gears and/or shafts (not shown) to a final drive assembly (not shown) that is configured to drive a pair of road wheels (not shown). The first and second shafts 22, 24 define a first axis of rotation, the first countershaft 28 defines a second axis of rotation and the second countershaft 30 defines a third axis of rotation.

A dual clutch assembly 32 is connectable between the input member 12 and the first and second shaft members 22, 24. The dual clutch assembly 32 includes a clutch housing 34 connectable for common rotation with the input member 12. The dual clutch assembly 32 could be either a dry or a wet clutch assembly. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first shaft or member 22 and the clutch element 38 is connected for common rotation with the second shaft or member 24. Thus, selective engagement of clutch element 36 with the clutch housing 34 connects the input member 12 for common rotation with the first shaft member 22. Selective engagement of clutch element 38 with the clutch housing 34 connects the input member 12 for common rotation with the second shaft member 24.

The gearing arrangement 20 also includes a plurality of co-planar, intermeshing gear sets 40, 50, 60, 70, 80, and 90. Co-planar gear sets 40, 50, 60, 70, 80, and 90 include intermeshing gear pairs: gear 42 and gear 44, gear 52 and gear 54, gear 62 and gear 64, gear 72 and gear 74, gear 82 and gear 84, and gear 92 and gear 94, respectively. In an embodiment of the present invention, gears 42, 52, and 62 are either rotatably fixed for common rotation with the second shaft member 24 or are selectively connectable for common rotation with the second shaft member 24. Gears 72, 82, and 92 are either rotatably fixed for common rotation with the first shaft member 22 or are selectively connectable for common rotation with the first shaft member 22. Gears 44 and 74 are either rotatably fixed for common rotation with the second countershaft 30 or are selectively connectable for common rotation with the second countershaft 30. Further, gears 54, 64, 84, and 94 are either rotatably fixed for common rotation with the first countershaft 28 or are selectively connectable for common rotation with the first countershaft 28. The individual gears of co-planar gear sets 40, 50, 60, 70, 80, and 90 are independently and selectively connectable for common rotation with the first shaft member 22, second shaft member 24, first countershaft 28 or second countershaft 30 by synchronizer assemblies, as will be further described hereinafter. Of course, the present invention contemplates other selectively actuatable devices other than synchronizers for connecting gears to shafts.

Figure 2:
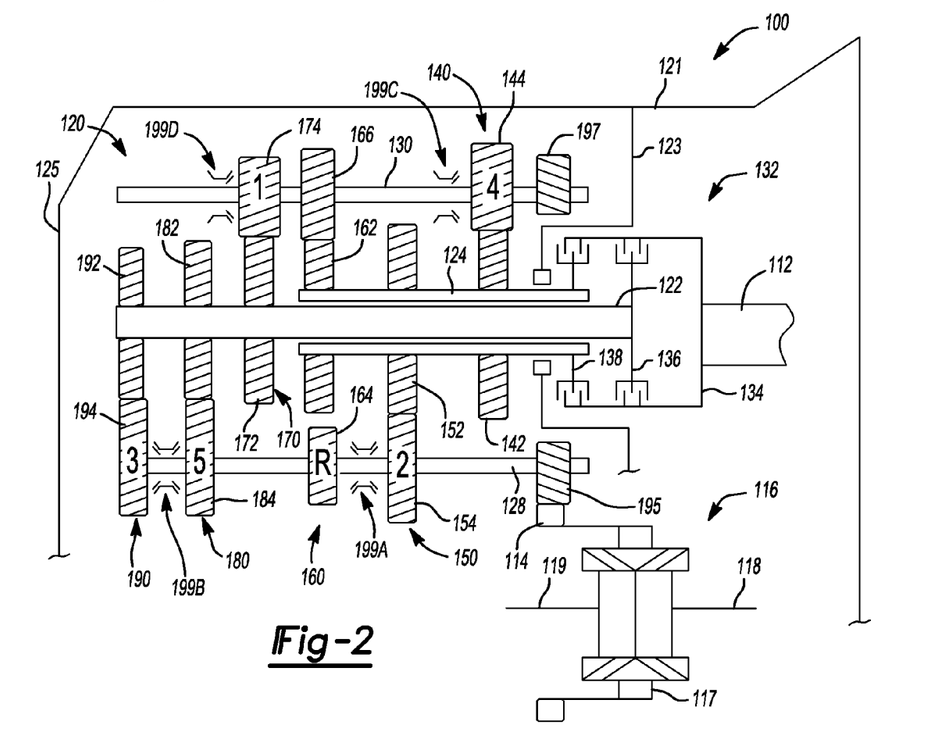
FIG. 2 is a schematic diagram of an embodiment of a five speed transmission illustrating synchronizer and output gear locations, in accordance with the present invention.

Referring now to FIG. 2, another embodiment of a multiple speed transmission is generally indicated by reference number 100. The transmission 100 includes an input shaft or member 112 and an output gear or member 114. The input member 112 is continuously connected with an engine (not shown) or other torque producing machine to provide a driving torque to input member 112. The output member 114 rotatably drives a final drive assembly 116. More specifically, the final drive assembly 116 includes a differential gear set coupled to and supported in a differential housing 117. Differential housing 117 is coupled to and is rotatably driven by output member 114. Further, differential housing 117 transfers torque delivered by output member 114 to the differential gear set that is rotatably coupled to first and second side axles 118, 119, and on to road wheels (not shown) coupled to side axles 118, 119.

The transmission 100 includes a gearing arrangement 120 that is at least partially enclosed by a housing 121. The housing 121 includes end walls 123 and 125. End wall 123 is located on a front or side of the transmission 100 proximate the dual clutch assembly 132 and end wall 125 is located on an opposite side of the transmission housing 121 than end wall 123. As in the embodiment described above, the gearing arrangement 120 of transmission 100 includes a first transmission input shaft or member 122, a second transmission input shaft or member 124, a first countershaft 128 and a second countershaft 130. The second shaft or member 124 is a sleeve shaft that is concentric with and overlies the first shaft or member 122. The first and second countershafts 128, 130 are each spaced apart from and parallel with the first and second shaft members 122,124. The first and second shafts 122,124 define a first axis of rotation, the first countershaft 128 defines a second axis of rotation and the second countershaft 130 defines a third axis of rotation.

A dual clutch assembly 132 is connectable between the input member 112 and the first and second shaft members 122, 124. The dual clutch assembly 132 includes a clutch housing 134 connectable for common rotation with the input member 112. Further, the dual clutch assembly 132 has first and second clutch elements or hubs 136 and 138. Clutch elements 136 and 138 together with the clutch housing 134 are configured to form a friction clutch, as is known in the art as a dual clutch. More specifically, clutch elements 136, 138 and the clutch housing 134 have friction plates mounted thereon or otherwise coupled thereto that interact to form a friction clutch. The clutch element 136 is connected for common rotation with the first shaft or member 122 and the clutch element 138 is connected for common rotation with the second shaft or member 124. Thus, selective engagement of clutch element 136 with the clutch housing 134 connects the input member 112 for common rotation with the first shaft member 122. Selective engagement of clutch element 138 with the clutch housing 134 connects the input member 112 for common rotation with the second shaft member 124.

The gearing arrangement 120 also includes a plurality of co-planar, intermeshing gear sets 140, 150, 160, 170, 180, and 190. Co-planar gear set 140 includes gear 142 and gear 144. Gear 142 is rotatably fixed and connected for common rotation with the second shaft 124 and intermeshes with gear 144. Gear 144 is selectively connectable for common rotation with the second countershaft member 130. Gear set 140 is disposed adjacent the end wall 123.

Co-planar gear set 150 includes gear 152 and gear 154. Gear 152 is rotatably fixed and connected for common rotation with the second shaft member 124 and intermeshes with gear 154. Gear 154 is selectively connectable for common rotation with the first countershaft 128. Gear set 150 is positioned adjacent gear set 140.

Co-planar gear set 160 includes gear 162, gear 164, and gear 166. Gear 162 is rotatably fixed and connected for common rotation with the second shaft member 124 and intermeshes with gear 166. Gear 166 is supported by the second countershaft 130, however, gear 166 is not rotationally coupled by the second countershaft 130. Gear 166 intermeshes with gear 164. Gear 164 is selectively connectable for common rotation with the first countershaft 128. Gear set 160 is disposed adjacent gear set 150.

Co-planar gear set 170 includes gear 172 and gear 174. Gear 172 is rotatably fixed and connected for common rotation with the first shaft 122 and intermeshes with gear 174. Gear 174 is selectively connectable for common rotation with the second countershaft member 130. Gear set 170 is located adjacent gear set 160.

Co-planar gear set 180 includes gear 182 and gear 184. Gear 182 is rotatably fixed and connected for common rotation with the first shaft member 122 and intermeshes with gear 184. Gear 184 is selectively connectable for common rotation with the first countershaft 128. Gear set 180 is located adjacent gear set 170.

Co-planar gear set 190 includes gear 192 and gear 194. Gear 192 is rotatably fixed and connected for common rotation with the first shaft member 122 and intermeshes with gear 194. Gear 194 is selectively connectable for common rotation with the first countershaft 128. Gear set 190 is positioned between gear set 180 and end wall 125 of transmission 100. It should be noted that gear sets 140, 150, 160, 170, 180, and 190 can be rearranged in sequence and not deviate from the intent of the invention.

Further, a first countershaft transfer gear 195 is rotatably fixed and connected for common rotation with the first countershaft member 128. A second countershaft transfer gear 197 is rotatably fixed and connected for common rotation with the second countershaft member 130. First countershaft transfer gear 195 is configured to mesh with output member 114 and the second countershaft transfer gear 197 is configured to mesh with output member 114. However, the first countershaft transfer gear 195 and the second countershaft transfer gear 197 do not mesh with each other. The first countershaft transfer gear 195 is disposed between gear 144 and end wall 123 of the transmission housing 121. The second countershaft transfer gear 197 is disposed between gear 146 and end wall 123 of the transmission housing 121. The output member 114 is co-planar with first and second countershaft transfer gears 195, 197 and positioned between the gear set 140 and end wall 123 of the transmission housing 121.

The transmission 100 further includes a plurality of selectively actuatable synchronizer assemblies 199A, 199B, 199C, and 199D. Synchronizers 199C and 199D are single sided synchronizers that generally include a shift fork (not shown) that is bi-directionally translated by an actuator (not shown) into either an engaged position or a neutral or disengaged position. In the present embodiment, synchronizer 199C is selectively actuatable to connect gear 144 for common rotation with the second countershaft 130, and synchronizer 199D is selectively actuatable to connect gear 174 for common rotation with the second countershaft 130. Synchronizers 199A and 199B are double sided synchronizers and generally include a shift fork (not shown) that is bi-directionally translated by an actuator (not shown) into at least two engaged positions and a neutral or disengaged position. In the present embodiment, synchronizer 199A is selectively actuatable to connect for common rotation gear 154 with the first countershaft 128 and is selectively actuatable to connect for common rotation gear 164 with the first countershaft 128. In the present embodiment, synchronizer 199B is selectively actuatable to connect for common rotation gear 184 with the first countershaft 128 and is selectively actuatable to connect for common rotation gear 194 with the first countershaft 128.

The transmission 100 is capable of transmitting torque from the input shaft 112 to the output member 114 in at least five forward torque ratios and at least one reverse torque ratio. Each of the forward torque ratios and the reverse torque ratio is attained by selective engagement of the dual clutch assembly 132 and one or more of the synchronizer assemblies 199A-D. Those skilled in the art will readily understand that a different speed ratio is associated with each torque ratio.

It should be appreciated that each individual gear set 140, 150, 160, 170, 180, and 190 provides one or more forward and/or reverse gear ratios upon selective engagement of the synchronizer assemblies 199A-D. However, which synchronizer and which gear set are associated with a particular forward or reverse speed ratio may vary without departing from the scope of the present invention.

For example, to establish the reverse torque ratio, clutch element 138 is engaged to couple the input member 112 with the second shaft 124 and synchronizer 199A is engaged to connect gear 164 to the first countershaft 128. More specifically, input torque from the input shaft 112 is transferred through the dual clutch assembly 132 to the second shaft 124, through gear 162 to gear 166, through gear 166 to gear 164, from gear 164 to synchronizer 199A, from synchronizer 199A to first countershaft 128, from first countershaft 128 to transfer gear 195, from transfer gear 195 to output gear 114 and from output gear 114 to differential housing 117 of final drive assembly 116.

To establish a first forward torque ratio (i.e. a 1st gear), clutch element 136 is engaged to couple the input member 112 with the first shaft member 122 and synchronizer 199D is activated to couple gear 174 to the second countershaft 130. Input torque from the input member 112 is transferred through the dual clutch assembly 132 to the first shaft member 122 to gear 172. Gear 172 transfers torque to gear 174 which transfers the torque to the second countershaft 130 through synchronizer 199D, from the second countershaft 130 to transfer gear 197, from transfer gear 197 to output gear 114, and from output gear 114 to differential housing 117 of final drive assembly 116.

To establish a second forward torque ratio (i.e. a 2nd gear), clutch element 138 is engaged to couple the input member 112 to the second shaft 124 which rotates gear 152 and synchronizer 199A is activated to couple gear 154 to the first countershaft member 128. Accordingly, input torque from the input member 112 is transferred through the dual clutch assembly 132 to the second shaft member 124 to gear 152. Gear 152 transfers torque to gear 154 which transfers the torque to the first countershaft 128 through synchronizer 199A, from the first countershaft 128 to transfer gear 195, from transfer gear 195 to output gear 114 and from output gear 114 to differential housing 117 of final drive assembly 116.

To establish a third forward torque ratio (i.e. a 3rd gear), clutch element 136 is engaged to couple the input member 112 to the first shaft 122 which rotates gear 192 and synchronizer 199B is engaged to couple gear 194 to the first countershaft 128. Accordingly, input torque from the input member 112 is transferred through the dual clutch assembly 132 to the first shaft 122 to gear 192. Gear 192 transfers torque to gear 194 which transfers the torque to the first countershaft 128 through synchronizer 199B, from the first countershaft 128 to transfer gear 195, from transfer gear 195 to output gear 114 and from output gear 114 to differential housing 117 of final drive assembly 116.

To establish a fourth forward torque ratio (i.e. a 4th gear), clutch element 138 is engaged to couple the input member 112 to the second shaft member 124 which rotates gear 142 and synchronizer 199C is activated to couple gear 144 to the second countershaft 130. Thus, input torque from the input member 112 is transferred through the dual clutch assembly 132 to the second shaft 124 to gear 142. Gear 142 transfers torque to gear 144 which transfers the torque to the second countershaft 130 through synchronizer 199C, from the second countershaft 130 to transfer gear 197, from transfer gear 197 to output gear 114 and from output gear 114 to differential housing 117 of final drive assembly 116.

To establish a fifth forward torque ratio (i.e. a 5th gear), clutch element 136 is engaged to couple the input member 112 to the first shaft 122 which rotates gear 182 and synchronizer 199B is activated to couple gear 184 to the first countershaft 128. Thus, input torque from the input member 112 is transferred through the dual clutch assembly 132 to the first shaft 122 to gear 182. Gear 182 transfers torque to gear 184 which transfers the torque to the first countershaft 128 through synchronizer 199B, from the first countershaft 128 to transfer gear 195, from transfer gear 195 to output gear 114 and from output gear 114 to differential housing 117 of final drive assembly 116.

Again, it should be appreciated that any one of the gear sets 140, 150, 160, 170, 180, and 190 may be changed to produce a certain forward and reverse torque ratio without departing from the scope of the present invention.

The present invention contemplates that a variety of torque ratios (i.e., the ratio of torque of the output member 114 to the input member 112) are achievable through the selection of tooth counts of the gears of the transmission 100. This arrangement provides the opportunity to achieve reduced transmission length in comparison with other transmissions.

Figure 3:
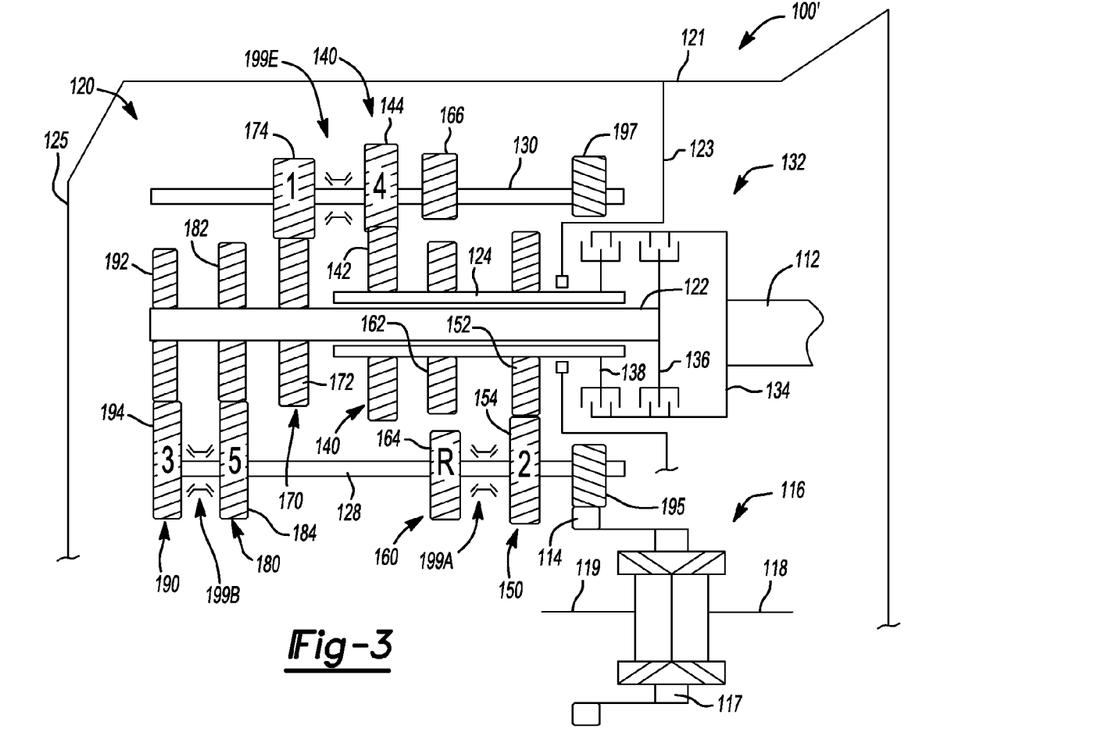
FIG. 3 is a schematic diagram of an embodiment of the five speed transmission of FIG. 2 illustrating alternate synchronizer and gear set locations, in accordance with the present invention.

Turning to FIG. 3, an embodiment of a multiple speed transmission is generally indicated by reference number 100'. The transmission 100' is substantially similar to transmission 100, and accordingly like components are indicated by like reference numbers. However, the transmission 100' has an alternate sequence of gear sets 140, 150, 160, 170, 180, 190 and one-way synchronizers 199C and 199D have been replaced by a two-way synchronizer, indicated by reference number 199E. Synchronizer 199E is selectively actuatable to connect for common rotation gear 144 with the second countershaft 130 and is selectively actuatable to connect for common rotation gear 174 with the second countershaft 130.

Figure 4:
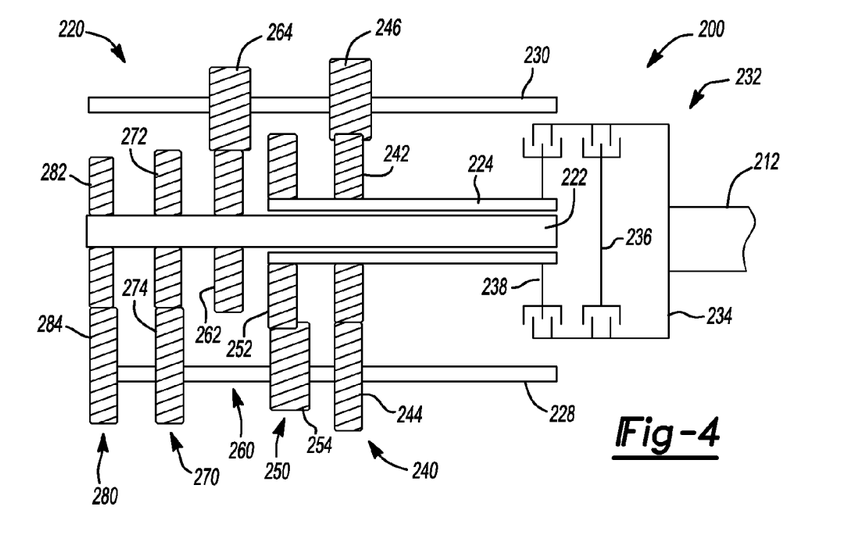
FIG. 4 is a schematic diagram of another embodiment of a five speed transmission, in accordance with the present invention.

Referring to FIG. 4, a multiple speed transmission is generally indicated by reference number 200. The transmission 200 includes an input member 212 and a gearing arrangement 220. The gearing arrangement 220 includes various shafts or members, co-planar intermeshing gear sets, a dual clutch assembly, and selectively engageable synchronizers, as will be described herein. For example, the gearing arrangement 220 includes a first transmission input shaft or member 222, a second transmission input shaft or member 224, a first countershaft 228 and a second countershaft 230. The second shaft or member 224 is a sleeve shaft that is concentric with and overlies the first shaft or member 222. The first and second countershafts 228, 230 are spaced apart from and parallel with the first and second shaft members 222, 224. Moreover, the first and second countershafts 228, 230 are connectable through additional gears and/or shafts (not shown) to a final drive assembly (not shown) that is configured to drive a pair of road wheels (not shown). The first and second shafts 222, 224 define a first axis of rotation, the first countershaft 228 defines a second axis of rotation and the second countershaft 230 defines a third axis of rotation.

A dual clutch assembly 232 is connectable between the input member 212 and the first and second shaft members 222, 224. The dual clutch assembly 232 includes a clutch housing 234 connectable for common rotation with the input member 212. The dual clutch assembly 232 could be either a dry or a wet clutch assembly. Further, the dual clutch assembly 232 has first and second clutch elements or hubs 236 and 238. Clutch elements 236 and 238 together with the clutch housing 234 are configured to form a friction clutch, as is known in the art as a dual clutch. More specifically, clutch elements 236, 238 and the clutch housing 234 have friction plates mounted thereon or otherwise coupled thereto that interact to form a friction clutch. The clutch element 236 is connected for common rotation with the first shaft or member 222 and the clutch element 238 is connected for common rotation with the second shaft or member 224. Thus, selective engagement of clutch element 236 with the clutch housing 234 connects the input member 212 for common rotation with the first shaft member 222. Selective engagement of clutch element 238 with the clutch housing 234 connects the input member 212 for common rotation with the second shaft member 224.

The gearing arrangement 220 also includes a plurality of co-planar, intermeshing gear sets 240, 250, 260, 270, and 280. Co-planar gear sets 240, 250, 260, 270, and 280 include intermeshing gear pairs: gear 242, gear 244, and gear 246, gear 252 and gear 254, gear 262 and gear 264, gear 272 and gear 274, and gear 282 and gear 284, respectively. In an embodiment of the present invention, gears 242 and 252 are either rotatably fixed for common rotation with the second shaft member 224 or are selectively connectable for common rotation with the second shaft member 224. Gears 262, 272 and 282 are either rotatably fixed for common rotation with the first shaft member 222 or are selectively connectable for common rotation with the first shaft member 222. Gears 246 and 264 are either rotatably fixed for common rotation with the second countershaft 230 or are selectively connectable for common rotation with the second countershaft 230. Further, gears 244, 254, 274, and 284 are either rotatably fixed for common rotation with the first countershaft 228 or are selectively connectable for common rotation with the first countershaft 228. The individual gears of co-planar gear sets 240, 250, 260, 270, 280 are independently and selectively connectable for common rotation with the first shaft member 222, second shaft member 224, first countershaft 228 or second countershaft 230 by synchronizer assemblies, as will be further described hereinafter. Of course, the present invention contemplates other selectively actuatable devices other than synchronizers for connecting gears to shafts.

Figure 5:
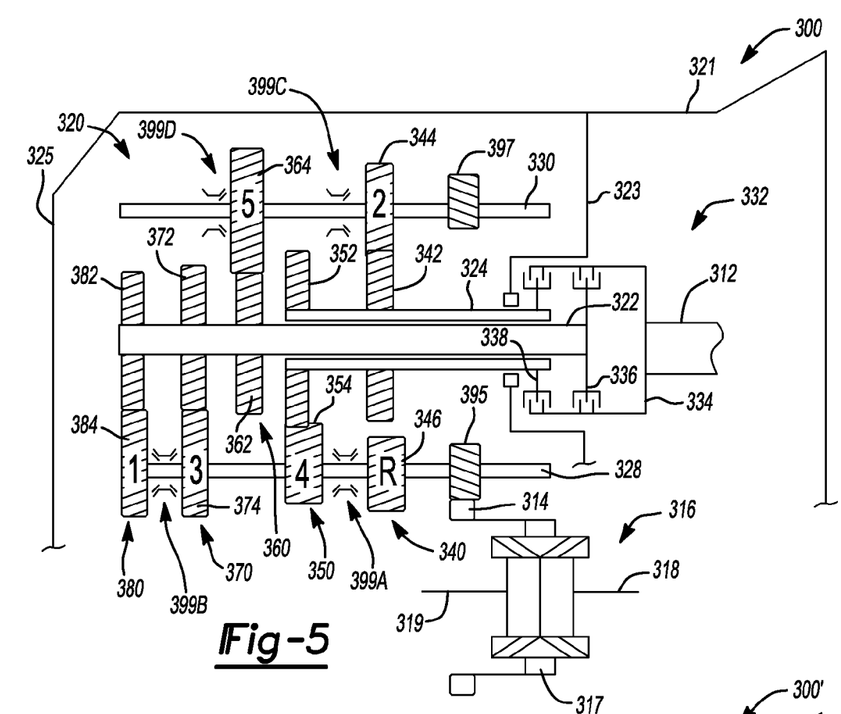
FIG. 5 is a schematic diagram of another embodiment of a five speed transmission illustrating synchronizer and output gear locations, in accordance with the present invention.

Referring now to FIG. 5, another embodiment of a multiple speed transmission is generally indicated by reference number 300. The transmission 300 includes an input shaft or member 312 and an output gear or member 314. The input member 312 is continuously connected with an engine (not shown) or other torque producing machine to provide a driving torque to input member 312. The output member 314 rotatably drives a final drive assembly 316. More specifically, the final drive assembly 316 includes a differential gear set coupled to and supported in a differential housing 317. Differential housing 317 is coupled to and is rotatably driven by output member 314. Further, differential housing 317 transfers torque delivered by output member 314 to the differential gear set that is rotatably coupled to first and second side axles 318, 319, and on to road wheels (not shown) coupled to side axles 318, 319.

The transmission 300 includes a gearing arrangement 320 that is at least partially enclosed by a housing 321. The housing 321 includes end walls 323 and 325. End wall 323 is located on a front or side of the transmission 300 proximate a dual clutch assembly 332 and end wall 325 is located on an opposite side of the transmission housing 321 than end wall 323. As in the embodiment described above, the gearing arrangement 320 of transmission 300 includes a first transmission input shaft or member 322, a second transmission input shaft or member 324, a first countershaft 328 and a second countershaft 330. The second shaft or member 324 is a sleeve shaft that is concentric with and overlies the first shaft or member 322. The first and second countershafts 328, 330 are each spaced apart from and parallel with the first and second shaft members 322, 324. The first and second shafts 322, 324 define a first axis of rotation, the first countershaft 328 defines a second axis of rotation and the second countershaft 330 defines a third axis of rotation.

The dual clutch assembly 332 is connectable between the input member 312 and the first and second shaft members 322, 324. The dual clutch assembly 332 includes a clutch housing 334 connectable for common rotation with the input member 312. Further, the dual clutch assembly 332 has first and second clutch elements or hubs 336 and 338. Clutch elements 336 and 338 together with the clutch housing 334 are configured to form a friction clutch, as is known in the art as a dual clutch. More specifically, clutch elements 336, 338 and the clutch housing 334 have friction plates mounted thereon or otherwise coupled thereto that interact to form a friction clutch. The clutch element 336 is connected for common rotation with the first shaft or member 322 and the clutch element 338 is connected for common rotation with the second shaft or member 324. Thus, selective engagement of clutch element 336 with the clutch housing 334 connects the input member 312 for common rotation with the first shaft member 322. Selective engagement of clutch element 338 with the clutch housing 334 connects the input member 312 for common rotation with the second shaft member 324.

The gearing arrangement 320 also includes a plurality of co-planar, intermeshing gear sets 340, 350, 360, 370, and 380. Co-planar gear set 340 includes gear 342, gear 344, and gear 346. Gear 342 is rotatably fixed and connected for common rotation with the second shaft 324. Gear 344 is selectively connectable for common rotation with the second countershaft member 330 and intermeshes with gear 342. Gear 346 is selectively connectable for common rotation with the first countershaft member 328 and intermeshes with gear 344. Gear set 340 is disposed adjacent the end wall 323.

Co-planar gear set 350 includes gear 352 and gear 354. Gear 352 is rotatably fixed and connected for common rotation with the second shaft member 324 and intermeshes with gear 354. Gear 354 is selectively connectable for common rotation with the first countershaft 328. Gear set 350 is positioned adjacent gear set 340.

Co-planar gear set 360 includes gear 362 and gear 364. Gear 362 is rotatably fixed and connected for common rotation with the first shaft member 322 and intermeshes with gear 364. Gear 364 is selectively connectable for common rotation with the second countershaft 330. Gear set 360 is disposed adjacent gear set 350.

Co-planar gear set 370 includes gear 372 and gear 374. Gear 372 is rotatably fixed and connected for common rotation with the first shaft 322 and intermeshes with gear 374. Gear 374 is selectively connectable for common rotation with the first countershaft member 328. Gear set 370 is located adjacent gear set 360.

Co-planar gear set 380 includes gear 382 and gear 384. Gear 382 is rotatably fixed and connected for common rotation with the first shaft member 322 and intermeshes with gear 384. Gear 384 is selectively connectable for common rotation with the first countershaft 328. Gear set 380 is positioned between gear set 370 and end wall 325. It should be noted that gear sets 340, 350, 360, 370, 380 can be rearranged in sequence and not deviate from the intent of the invention.

Further, a first countershaft transfer gear 395 is rotatably fixed and connected for common rotation with the first countershaft member 328. A second countershaft transfer gear 397 is rotatably fixed and connected for common rotation with the second countershaft member 330. First countershaft transfer gear 395 is configured to mesh with output member 314 and the second countershaft transfer gear 397 is configured to mesh with output member 314. However, the first countershaft transfer gear 395 and the second countershaft transfer gear 397 do not mesh with each other. The first countershaft transfer gear 395 is disposed between gear 346 and end wall 323 of the transmission housing 321. The second countershaft transfer gear 397 is disposed between gear 344 and end wall 323 of the transmission housing 321. The output member 314 is co-planar with first and second countershaft transfer gears 395, 397 and positioned between the gear set 340 and end wall 323 of the transmission housing 321.

The transmission 300 further includes a plurality of selectively actuatable synchronizer assemblies 399A, 399B, 399C and 399D. Synchronizers 399C and 399D are single sided synchronizers that generally include a shift fork (not shown) that is bi-directionally translated by an actuator (not shown) into either an engaged position or a neutral or disengaged position. In the present embodiment, synchronizer 399C is selectively actuatable to connect gear 344 for common rotation with the second countershaft 330 and synchronizer 399D is selectively actuatable to connect gear 364 for common rotation with the second countershaft 330. Synchronizers 399A and 399B are double sided synchronizers and generally include a shift fork (not shown) that is bi-directionally translated by an actuator (not shown) into at least two engaged positions and a neutral or disengaged position. In the present embodiment, synchronizer 399A is selectively actuatable to connect for common rotation gear 346 with the first countershaft 328 and is selectively actuatable to connect for common rotation gear 354 with the first countershaft 328. In the present embodiment, synchronizer 399B is selectively actuatable to connect for common rotation gear 374 with the first countershaft 328 and is selectively actuatable to connect for common rotation gear 384 with the first countershaft 328.

The transmission 300 is capable of transmitting torque from the input shaft 312 to the output member 314 in at least five forward torque ratios and at least one reverse torque ratio. Each of the forward torque ratios and the reverse torque ratio is attained by selective engagement of the dual clutch assembly 332 and one or more of the synchronizer assemblies 399A-D. Those skilled in the art will readily understand that a different speed ratio is associated with each torque ratio.

It should be appreciated that each individual gear set 340, 350, 360, 370, and 380 provides one or more forward and/or reverse gear ratios upon selective engagement of the synchronizer assemblies 399A-D. However, which synchronizer and which gear set are associated with a particular forward or reverse speed ratio may vary without departing from the scope of the present invention.

For example, to establish the reverse torque ratio, clutch element 338 is engaged to couple the input member 312 with the second shaft member 324 and synchronizer 399A is engaged to connect gear 346 to the first countershaft 328. More specifically, input torque from the input shaft 312 is transferred through the dual clutch assembly 332 to the second shaft 324, through gear 342 to gear 344, through gear 344 to gear 346, from gear 346 to synchronizer 399A, from synchronizer 399A to first countershaft 328, from first countershaft 328 to transfer gear 395, from transfer gear 395 to output gear 314 and from output gear 314 to differential housing 317 of final drive assembly 316.

To establish a first forward torque ratio (i.e. a 1st gear), clutch element 336 is engaged to couple the input member 312 with the first shaft member 322 and synchronizer 399B is activated to couple gear 384 to the first countershaft 328. Input torque from the input member 312 is transferred through the dual clutch assembly 332 to the first shaft member 322 to gear 382. Gear 382 transfers torque to gear 384 which transfers the torque to the first countershaft 328 through synchronizer 399B, from the first countershaft 328 to transfer gear 395, from transfer gear 395 to output gear 314, and from output gear 314 to differential housing 317 of final drive assembly 316.

To establish a second forward torque ratio (i.e. a 2nd gear), clutch element 338 is engaged to couple the input member 312 to the second shaft 324 which rotates gear 342 and synchronizer 399C is activated to couple gear 344 to the second countershaft member 330. Accordingly, input torque from the input member 312 is transferred through the dual clutch assembly 332 to the second shaft member 324 to gear 342. Gear 342 transfers torque to gear 344 which transfers the torque to the second countershaft 330 through synchronizer 399C, from the second countershaft 330 to transfer gear 397, from transfer gear 397 to output gear 314 and from output gear 314 to differential housing 317 of final drive assembly 316.

To establish a third forward torque ratio (i.e. a 3rd gear), clutch element 336 is engaged to couple the input member 312 to the first shaft 322 which rotates gear 372 and synchronizer 399B is engaged to couple gear 374 to the first countershaft 328. Accordingly, input torque from the input member 312 is transferred through the dual clutch assembly 332 to the first shaft 322 to gear 372. Gear 372 transfers torque to gear 374 which transfers the torque to the first countershaft 328 through synchronizer 399B, from the first countershaft 328 to transfer gear 395, from transfer gear 395 to output gear 314 and from output gear 314 to differential housing 317 of final drive assembly 316.

To establish a fourth forward torque ratio (i.e. a 4th gear), clutch element 338 is engaged to couple the input member 312 to the second shaft member 324 which rotates gear 352 and synchronizer 399A is activated to couple gear 354 to the first countershaft 328. Thus, input torque from the input member 312 is transferred through the dual clutch assembly 332 to the second shaft 324 to gear 352. Gear 352 transfers torque to gear 354 which transfers the torque to the first countershaft 328 through synchronizer 399A, from the first countershaft 328 to transfer gear 395, from transfer gear 395 to output gear 314 and from output gear 314 to differential housing 317 of final drive assembly 316.

To establish a fifth forward torque ratio (i.e. a 5th gear), clutch element 336 is engaged to couple the input member 312 to the first shaft 322 which rotates gear 362 and synchronizer 399D is activated to couple gear 364 to the second countershaft 330. Thus, input torque from the input member 312 is transferred through the dual clutch assembly 332 to the first shaft 322 to gear 362. Gear 362 transfers torque to gear 364 which transfers the torque to the second countershaft 330 through synchronizer 399D, from the second countershaft 330 to transfer gear 397, from transfer gear 397 to output gear 314 and from output gear 314 to differential housing 317 of final drive assembly 316.

Again, it should be appreciated that any one of the gear sets 340, 350, 360, 370, and 380 may be changed to produce a certain forward and reverse torque ratio without departing from the scope of the present invention.

The present invention contemplates that a variety of torque ratios (i.e., the ratio of torque of the output member 314 to the input member 312) are achievable through the selection of tooth counts of the gears of the transmission 300. This arrangement provides the opportunity to achieve reduced transmission length in comparison with other transmissions.

Figure 6:
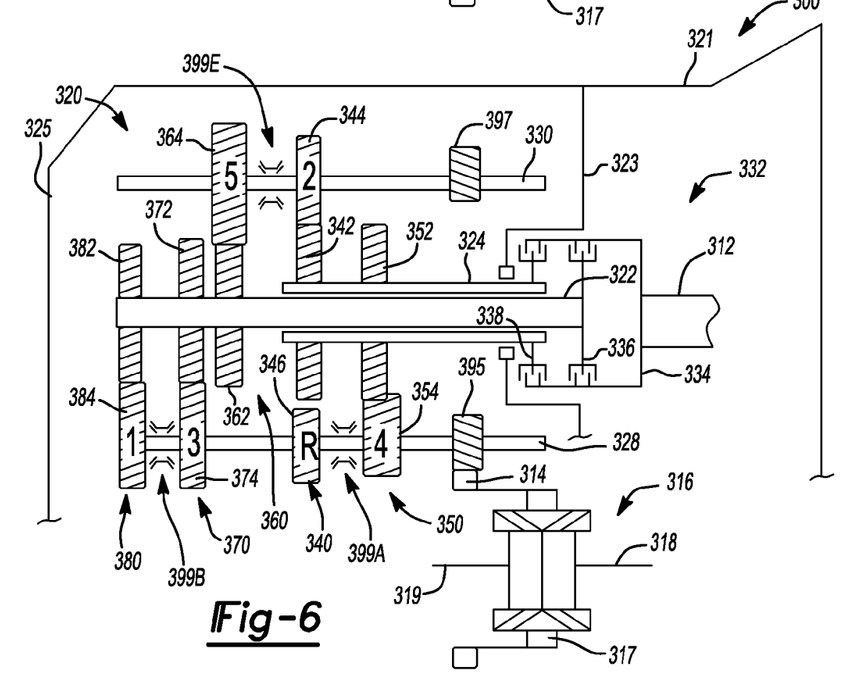
FIG. 6 is a schematic diagram of an embodiment of the five speed transmission of FIG. 5 illustrating alternate synchronizer and gear set locations, in accordance with the present invention.

Turning to FIG. 6, an embodiment of a multiple speed transmission is generally indicated by reference number 300'. The transmission 300' is substantially similar to transmission 300, and accordingly like components are indicated by like reference numbers. However, the transmission 300' has an alternate sequence of gear sets 340, 350, 360, 370, 380 and one-way synchronizers 399C and 399D have been replaced by a two-way synchronizer, indicated by reference number 399E. Synchronizer 399E is selectively actuatable to connect for common rotation gear 344 with the second countershaft 330 and is selectively actuatable to connect for common rotation gear 364 with the second countershaft 330.

Figure 7:
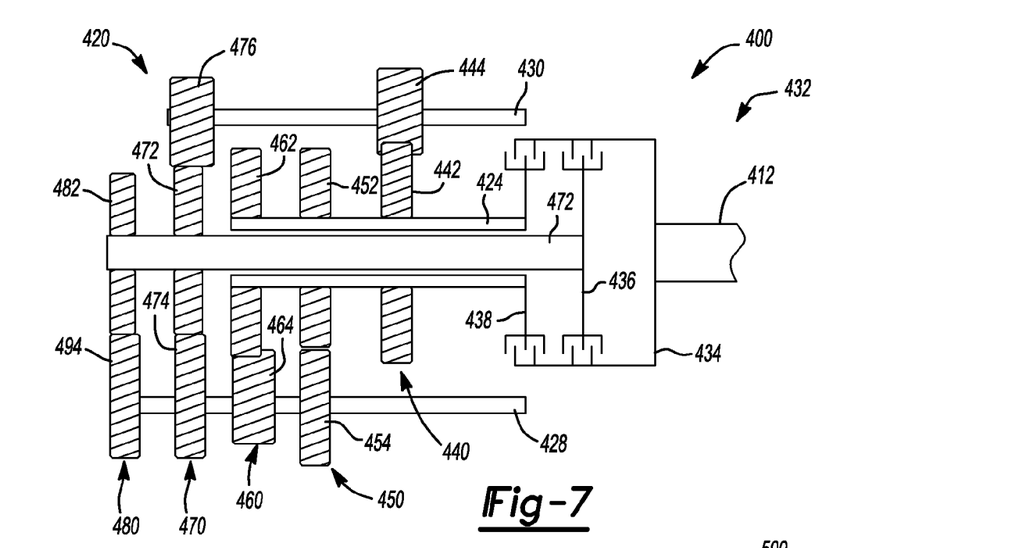
FIG. 7 is a schematic diagram of still another embodiment of a five speed transmission, in accordance with the present invention.

Referring to FIG. 7, a multiple speed transmission is generally indicated by reference number 400. The transmission 400 includes an input member 412 and a gearing arrangement 420. The gearing arrangement 420 includes various shafts or members, co-planar intermeshing gear sets, a dual clutch assembly, and selectively engageable synchronizers, as will be described herein. For example, the gearing arrangement 420 includes a first transmission input shaft or member 422, a second transmission input shaft or member 424, a first countershaft 428 and a second countershaft 430. The second shaft or member 424 is a sleeve shaft that is concentric with and overlies the first shaft or member 422. The first and second countershafts 428, 430 are spaced apart from and parallel with the first and second shaft members 422, 424. Moreover, the first and second countershafts 428, 430 are connectable through additional gears and/or shafts (not shown) to a final drive assembly (not shown) that is configured to drive a pair of road wheels (not shown). The first and second shafts 422, 424 define a first axis of rotation, the first countershaft 428 defines a second axis of rotation and the second countershaft 430 defines a third axis of rotation.

A dual clutch assembly 432 is connectable between the input member 412 and the first and second shaft members 422, 424. The dual clutch assembly 432 includes a clutch housing 434 connectable for common rotation with the input member 412. The dual clutch assembly 432 could be either a dry or a wet clutch assembly. Further, the dual clutch assembly 432 has first and second clutch elements or hubs 436 and 438. Clutch elements 436 and 438 together with the clutch housing 434 are configured to form a friction clutch, as is known in the art as a dual clutch. More specifically, clutch elements 436, 438 and the clutch housing 434 have friction plates mounted thereon or otherwise coupled thereto that interact to form a friction clutch. The clutch element 436 is connected for common rotation with the first shaft or member 422 and the clutch element 438 is connected for common rotation with the second shaft or member 424. Thus, selective engagement of clutch element 436 with the clutch housing 434 connects the input member 412 for common rotation with the first shaft member 422. Selective engagement of clutch element 438 with the clutch housing 434 connects the input member 412 for common rotation with the second shaft member 424.

The gearing arrangement 420 also includes a plurality of co-planar, intermeshing gear sets 440, 450, 460, 470, and 480. Co-planar gear sets 440, 450, 460, 470, and 480 include intermeshing gear pairs: gear 442 and gear 444, gear 452 and gear 454, gear 462 and gear 464, gear 472, gear 474 and gear 476, and gear 482 and gear 484, respectively. In an embodiment of the present invention, gears 442, 452, and 462 are either rotatably fixed for common rotation with the second shaft member 424 or are selectively connectable for common rotation with the second shaft member 424. Gears 472 and 482 are either rotatably fixed for common rotation with the first shaft member 422 or are selectively connectable for common rotation with the first shaft member 422. Gears 444 and 476 are either rotatably fixed for common rotation with the second countershaft 430 or are selectively connectable for common rotation with the second countershaft 430. Further, gears 454, 464, 474, and 484 are either rotatably fixed for common rotation with the first countershaft 428 or are selectively connectable for common rotation with the first countershaft 428. The individual gears of co-planar gear sets 440, 450, 460, 470, and 480 are independently and selectively connectable for common rotation with the first shaft 422, second shaft member 424, first countershaft 428 or second countershaft 430 by synchronizer assemblies, as will be further described hereinafter. Of course, the present invention contemplates other selectively actuatable devices other than synchronizers for connecting gears to shafts.

Figure 8:
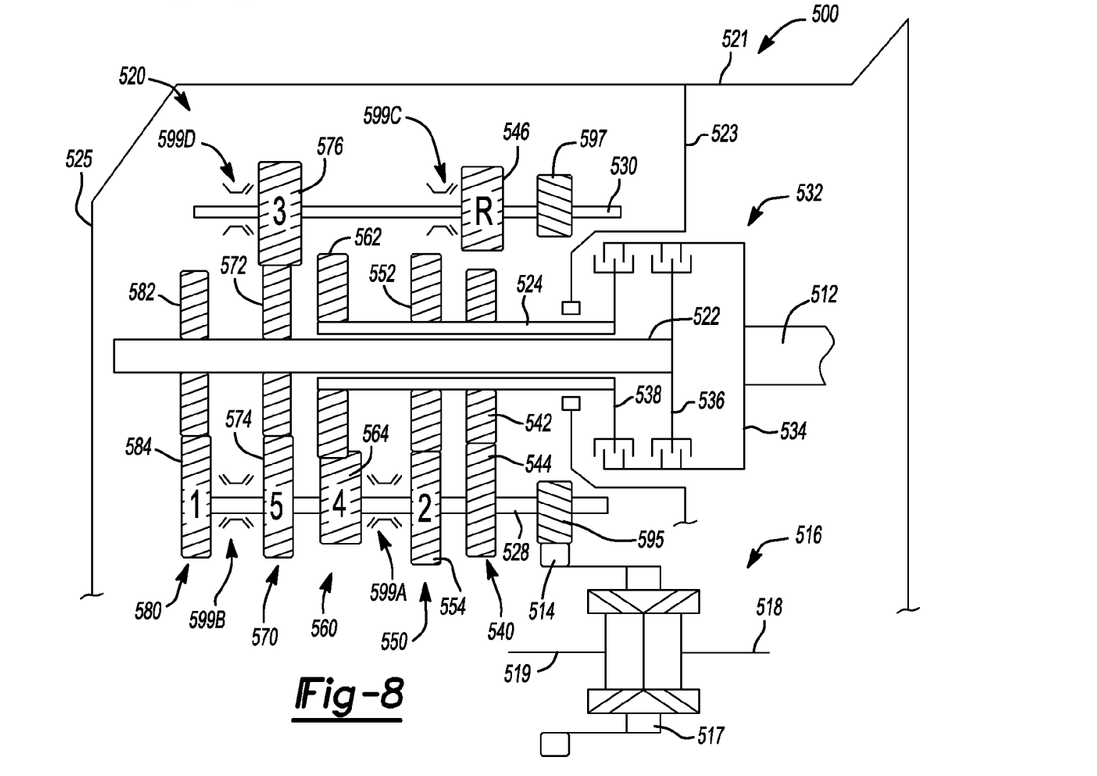
FIG. 8 is a schematic diagram of an still another embodiment of a five speed transmission illustrating synchronizer and output gear locations, in accordance with the present invention.

Referring now to FIG. 8, another embodiment of a multiple speed transmission is generally indicated by reference number 500. The transmission 500 includes an input shaft or member 512 and an output gear or member 514. The input member 512 is continuously connected with an engine (not shown) or other torque producing machine to provide a driving torque to input member 512. The output member 514 rotatably drives a final drive assembly 516. More specifically, the final drive assembly 516 includes a differential gear set coupled to and supported in a differential housing 517. Differential housing 517 is coupled to and is rotatably driven by output member 514. Further, differential housing 517 transfers torque delivered by output member 514 to the differential gear set that is rotatably coupled to first and second side axles 518, 519, and on to road wheels (not shown) coupled to side axles 518, 519.

The transmission 500 includes a gearing arrangement 520 that is at least partially enclosed by a housing 521. The housing 521 includes end walls 523 and 525. End wall 523 is located on a front or side of the transmission 500 proximate a dual clutch assembly 532 and end wall 525 is located on an opposite side of the transmission housing 521 than end wall 523. As in the embodiment described above, the gearing arrangement 520 of transmission 500 includes a first transmission input shaft or member 522, a second transmission input shaft or member 524, a first countershaft 528 and a second countershaft 530. The second shaft or member 524 is a sleeve shaft that is concentric with and overlies the first shaft or member 522. The first and second countershafts 528, 530 are each spaced apart from and parallel with the first and second shaft members 522, 524. The first and second shafts 522, 524 define a first axis of rotation, the first countershaft 528 defines a second axis of rotation and the second countershaft 530 defines a third axis of rotation.

A dual clutch assembly 532 is connectable between the input member 512 and the first and second shaft members 522, 524. The dual clutch assembly 532 includes a clutch housing 534 connectable for common rotation with the input member 512. Further, the dual clutch assembly 532 has first and second clutch elements or hubs 536 and 538. Clutch elements 536 and 538 together with the clutch housing 534 are configured to form a friction clutch, as is known in the art as a dual clutch. More specifically, clutch elements 536, 538 and the clutch housing 534 have friction plates mounted thereon or otherwise coupled thereto that interact to form a friction clutch. The clutch element 536 is connected for common rotation with the first shaft or member 522 and the clutch element 538 is connected for common rotation with the second shaft or member 524. Thus, selective engagement of clutch element 536 with the clutch housing 534 connects the input member 512 for common rotation with the first shaft member 522. Selective engagement of clutch element 538 with the clutch housing 534 connects the input member 512 for common rotation with the second shaft member 524.

The gearing arrangement 520 also includes a plurality of co-planar, intermeshing gear sets 540, 550, 560, 570, and 580. Co-planar gear set 540 includes gear 542, gear 544, and gear 546. Gear 542 is rotatably fixed and connected for common rotation with the second shaft 524 and intermeshes with gear 544. Gear 544 is supported on first countershaft 528, however, gear 544 is not rotationally coupled to first countershaft 528. Gear 544 intermeshes with gear 546. Gear 546 is selectively connectable for common rotation with the second countershaft member 530. Gear set 540 is disposed adjacent the end wall 523.

Co-planar gear set 550 includes gear 552 and gear 554. Gear 552 is rotatably fixed and connected for common rotation with the second shaft member 524 and intermeshes with gear 554. Gear 554 is selectively connectable for common rotation with the first countershaft 528. Gear set 550 is positioned adjacent gear set 540.

Co-planar gear set 560 includes gear 562 and gear 564. Gear 562 is rotatably fixed and connected for common rotation with the second shaft member 524 and intermeshes with gear 564. Gear 564 is selectively connectable for common rotation with the first countershaft 528. Gear set 560 is disposed adjacent gear set 550.

Co-planar gear set 570 includes gear 572, gear 574 and gear 576. Gear 572 is rotatably fixed and connected for common rotation with the first shaft 522 and intermeshes with gear 574 and gear 576. Gear 574 is selectively connectable for common rotation with the first countershaft member 528. Gear 576 is selectively connectable for common rotation with the second countershaft member 530. Gear set 570 is located adjacent gear set 560.

Co-planar gear set 580 includes gear 582 and gear 584. Gear 582 is rotatably fixed and connected for common rotation with the first shaft 522 and intermeshes with gear 584. Gear 584 is selectively connectable for common rotation with the first countershaft member 528. Gear set 580 is located between gear set 570 and end wall 525. It should be noted that gear sets 540, 550, 560, 570, and 580 can be rearranged in sequence and not deviate from the intent of the invention.

Further, a first countershaft transfer gear 595 is rotatably fixed and connected for common rotation with the first countershaft member 528. A second countershaft transfer gear 597 is rotatably fixed and connected for common rotation with the second countershaft member 530. First countershaft transfer gear 595 is configured to mesh with output member 514 and the second countershaft transfer gear 597 is configured to mesh with output member 514. However, the first countershaft transfer gear 595 and the second countershaft transfer gear 597 do not mesh with each other. The first countershaft transfer gear 595 is disposed between gear 544 and end wall 523 of the transmission housing 521. The second countershaft transfer gear 597 is disposed between gear 546 and end wall 523 of the transmission housing 521. The output member 514 is co-planar with first and second countershaft transfer gears 595, 597 and positioned between the gear set 540 and end wall 523 of the transmission housing 521.

The transmission 500 further includes a plurality of selectively actuatable synchronizer assemblies 599A, 599B, 599C, and 599D. Synchronizers 599C and 599D are single sided synchronizers that generally include a shift fork (not shown) that is bi-directionally translated by an actuator (not shown) into either an engaged position or a neutral or disengaged position. In the present embodiment, synchronizer 599C is selectively actuatable to connect gear 546 for common rotation with the second countershaft 530 and synchronizer 599D is selectively actuatable to connect gear 576 for common rotation with the second countershaft 530. Synchronizers 599A and 599B are double sided synchronizers and generally include a shift fork (not shown) that is bi-directionally translated by an actuator (not shown) into at least two engaged positions and a neutral or disengaged position. In the present embodiment, synchronizer 599A is selectively actuatable to connect for common rotation gear 554 with the first countershaft 528 and is selectively actuatable to connect for common rotation gear 564 with the first countershaft 528. In the present embodiment, synchronizer 599B is selectively actuatable to connect for common rotation gear 574 with the first countershaft 528 and is selectively actuatable to connect for common rotation gear 584 with the first countershaft 528.

The transmission 500 is capable of transmitting torque from the input shaft 512 to the output member 514 in at least five forward torque ratios and at least one reverse torque ratio. Each of the forward torque ratios and the reverse torque ratio is attained by selective engagement of the dual clutch assembly 532 and one or more of the synchronizer assemblies 599A-D. Those skilled in the art will readily understand that a different speed ratio is associated with each torque ratio.

It should be appreciated that each individual gear set 540, 550, 560, 570, and 580 provides one or more forward and/or reverse gear ratios upon selective engagement of the synchronizer assemblies 599A-D. However, which synchronizer and which gear set are associated with a particular forward or reverse speed ratio may vary without departing from the scope of the present invention.

For example, to establish the reverse torque ratio, clutch element 538 is engaged to couple the input member 512 with the second shaft 524 and synchronizer 599C is engaged to connect gear 546 to the second countershaft 530. More specifically, input torque from the input shaft 512 is transferred through the dual clutch assembly 532 to the second shaft 524, through gear 542 to gear 544, through gear 544 to gear 546, from gear 546 to synchronizer 599C, from synchronizer 599C to second countershaft 530, from second countershaft 530 to transfer gear 597, from transfer gear 597 to output gear 514 and from output gear 514 to differential housing 517 of final drive assembly 516.

To establish a first forward torque ratio (i.e. a 1st gear), clutch element 536 is engaged to couple the input member 512 with the first shaft member 522 and synchronizer 599B is activated to couple gear 584 to the first countershaft 528. Input torque from the input member 512 is transferred through the dual clutch assembly 532 to the first shaft member 522 to gear 582. Gear 582 transfers torque to gear 584 which transfers the torque to the first countershaft 528 through synchronizer 599B, from the first countershaft 528 to transfer gear 595, from transfer gear 595 to output gear 514, and from output gear 514 to differential housing 517 of final drive assembly 516.

To establish a second forward torque ratio (i.e. a 2nd gear), clutch element 538 is engaged to couple the input member 512 to the second shaft 524 which rotates gear 552 and synchronizer 599A is activated to couple gear 554 to the first countershaft member 528. Accordingly, input torque from the input member 512 is transferred through the dual clutch assembly 532 to the second shaft member 524 to gear 552. Gear 552 transfers torque to gear 554 which transfers the torque to the first countershaft 528 through synchronizer 599A, from the first countershaft 528 to transfer gear 595, from transfer gear 595 to output gear 514 and from output gear 514 to differential housing 517 of final drive assembly 516.

To establish a third forward torque ratio (i.e. a 3rd gear), clutch element 536 is engaged to couple the input member 512 to the first shaft 522 which rotates gear 572 and synchronizer 599D is engaged to couple gear 576 to the second countershaft 530. Accordingly, input torque from the input member 512 is transferred through the dual clutch assembly 532 to the first shaft 522 to gear 572. Gear 572 transfers torque to gear 576 which transfers the torque to the second countershaft 530 through synchronizer 599D, from the second countershaft 530 to transfer gear 597, from transfer gear 597 to output gear 514 and from output gear 514 to differential housing 517 of final drive assembly 516.

To establish a fourth forward torque ratio (i.e. a 4th gear), clutch element 538 is engaged to couple the input member 512 to the second shaft member 524 which rotates gear 562 and synchronizer 599A is activated to couple gear 564 to the first countershaft 528. Thus, input torque from the input member 512 is transferred through the dual clutch assembly 532 to the second shaft 524 to gear 562. Gear 562 transfers torque to gear 564 which transfers the torque to the first countershaft 528 through synchronizer 599A, from the first countershaft 528 to transfer gear 595, from transfer gear 595 to output gear 514 and from output gear 514 to differential housing 517 of final drive assembly 516.

To establish a fifth forward torque ratio (i.e. a 5th gear), clutch element 536 is engaged to couple the input member 512 to the first shaft 522 which rotates gear 572 and synchronizer 599B is activated to couple gear 574 to the first countershaft 528. Thus, input torque from the input member 512 is transferred through the dual clutch assembly 532 to the first shaft 522 to gear 572. Gear 572 transfers torque to gear 574 which transfers the torque to the first countershaft 528 through synchronizer 599B, from the first countershaft 528 to transfer gear 595, from transfer gear 595 to output gear 514 and from output gear 514 to differential housing 517 of final drive assembly 516.

Again, it should be appreciated that any one of the gear sets 540, 550, 560, 570, and 580 may be changed to produce a certain forward and reverse torque ratio without departing from the scope of the present invention.

The present invention contemplates that a variety of torque ratios (i.e., the ratio of torque of the output member 514 to the input member 512) are achievable through the selection of tooth counts of the gears of the transmission 500. This arrangement provides the opportunity to achieve reduced transmission length in comparison with other transmissions.

Figure 9:
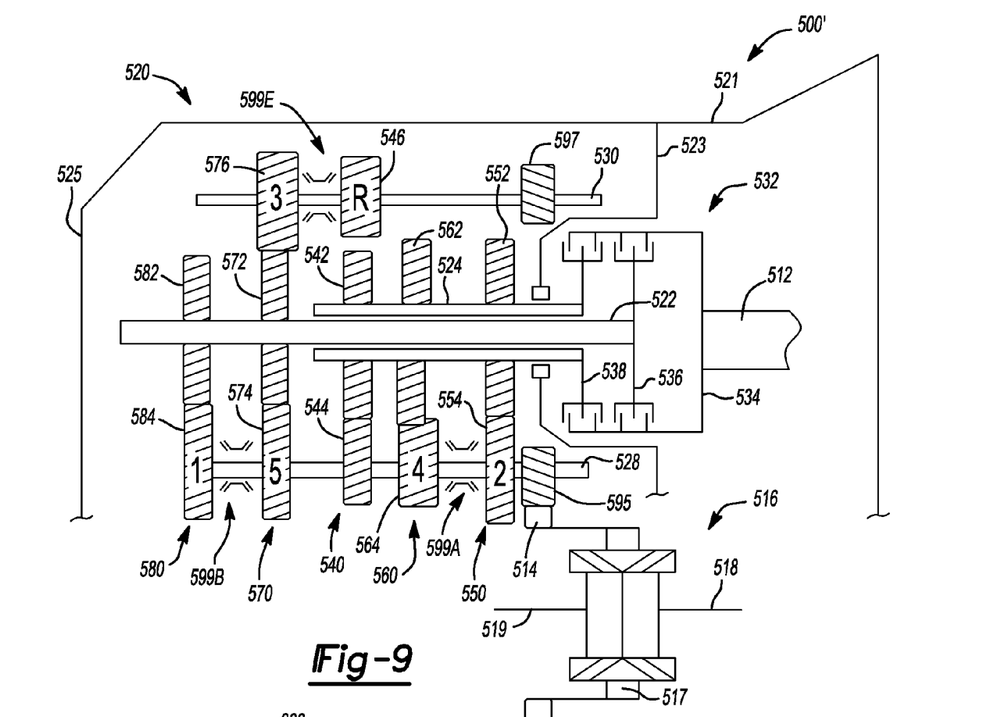
FIG. 9 is a schematic diagram of an embodiment of the five speed transmission of FIG. 8 illustrating alternate synchronizer and gear set locations, in accordance with the present invention.

Turning to FIG. 9, an embodiment of a multiple speed transmission is generally indicated by reference number 500'. The transmission 500' is substantially similar to transmission 500, and accordingly like components are indicated by like reference numbers. However, the transmission 500' has an alternate sequence of gear sets 540, 550, 560, 570, 580 and one-way synchronizers 599C and 599D have been replaced by a two-way synchronizer, indicated by reference number 599E. Synchronizer 599E is selectively actuatable to connect for common rotation gear 546 with the second countershaft 530 and is selectively actuatable to connect for common rotation gear 576 with the second countershaft 530.

Figure 10:
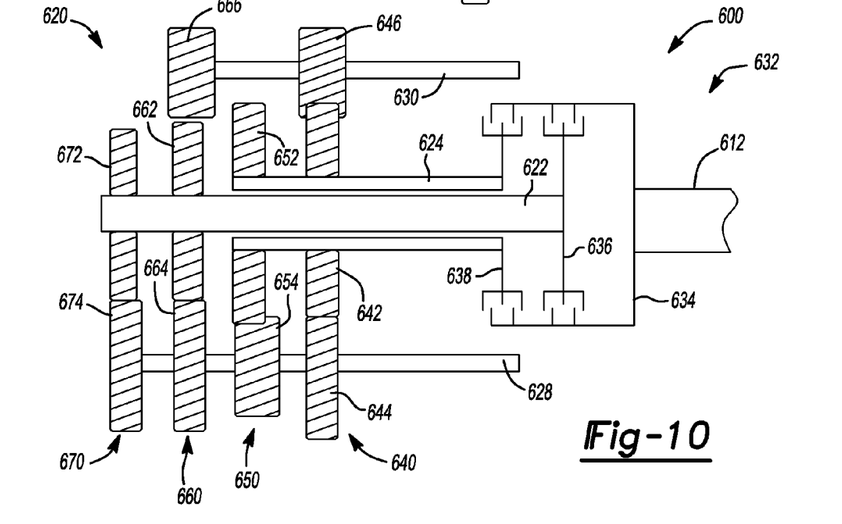
FIG. 10 is a schematic diagram of still another embodiment of a five speed transmission, in accordance with the present invention.

Referring to FIG. 10, a multiple speed transmission is generally indicated by reference number 600. The transmission 600 includes an input member 612 and a gearing arrangement 620. The gearing arrangement 620 includes various shafts or members, co-planar intermeshing gear sets, a dual clutch assembly, and selectively engageable synchronizers, as will be described herein. For example, the gearing arrangement 620 includes a first transmission input shaft or member 622, a second transmission input shaft or member 624, a first countershaft 628 and a second countershaft 630. The second shaft or member 624 is a sleeve shaft that is concentric with and overlies the first shaft or member 622. The first and second countershafts 628, 630 are spaced apart from and parallel with the first and second shaft members 622, 624. Moreover, the first and second countershafts 628, 630 are connectable through additional gears and/or shafts (not shown) to a final drive assembly (not shown) that is configured to drive a pair of road wheels (not shown). The first and second shafts 622, 624 define a first axis of rotation, the first countershaft 628 defines a second axis of rotation and the second countershaft 630 defines a third axis of rotation.

A dual clutch assembly 632 is connectable between the input member 612 and the first and second shaft members 622, 624. The dual clutch assembly 632 includes a clutch housing 634 connectable for common rotation with the input member 612. The dual clutch assembly 632 could be either a dry or a wet clutch assembly. Further, the dual clutch assembly 632 has first and second clutch elements or hubs 636 and 638. Clutch elements 636 and 638 together with the clutch housing 634 are configured to form a friction clutch, as is known in the art as a dual clutch. More specifically, clutch elements 636, 638 and the clutch housing 634 have friction plates mounted thereon or otherwise coupled thereto that interact to form a friction clutch. The clutch element 636 is connected for common rotation with the first shaft or member 622 and the clutch element 638 is connected for common rotation with the second shaft or member 624. Thus, selective engagement of clutch element 636 with the clutch housing 634 connects the input member 612 for common rotation with the first shaft member 622. Selective engagement of clutch element 638 with the clutch housing 634 connects the input member 612 for common rotation with the second shaft member 624.

The gearing arrangement 620 also includes a plurality of co-planar, intermeshing gear sets 640, 650, 660, and 670. Co-planar gear sets 640, 650, 660, and 670 include intermeshing gear pairs: gear 642, gear 644, and gear 646, gear 652 and gear 654, gear 662, gear 664, and gear 666, and gear 672 and gear 674, respectively. In an embodiment of the present invention, gears 642 and 652 are either rotatably fixed for common rotation with the second shaft member 624 or are selectively connectable for common rotation with the second shaft member 624. Gears 662 and 672 are either rotatably fixed for common rotation with the first shaft member 622 or are selectively connectable for common rotation with the first shaft member 622. Gears 646 and 666 are either rotatably fixed for common rotation with the second countershaft 630 or are selectively connectable for common rotation with the second countershaft 630. Further, gears 644, 654, 664, and 674 are either rotatably fixed for common rotation with the first countershaft 628 or are selectively connectable for common rotation with the first countershaft 628. The individual gears of co-planar gear sets 640, 650, 660, and 670 are independently and selectively connectable for common rotation with the first shaft member 622, second shaft member 624, first countershaft 628 or second countershaft 630 by synchronizer assemblies (not shown). Of course, the present invention contemplates other selectively actuatable devices other than synchronizers for connecting gears to shafts.

Figure 11:
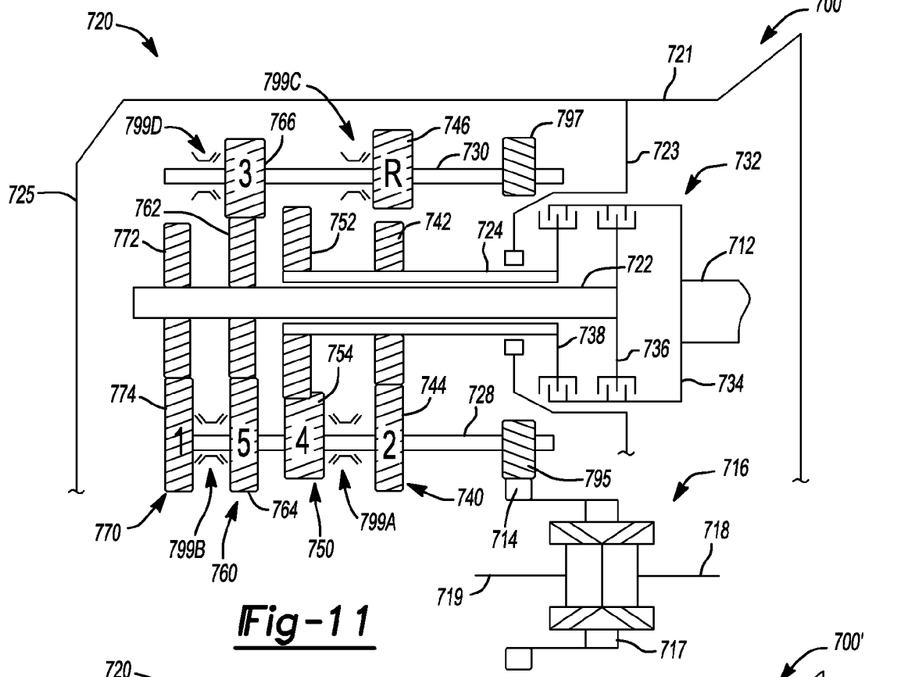
FIG. 11 is a schematic diagram of an still another embodiment of a five speed transmission illustrating synchronizer and output gear locations, in accordance with the present invention.

Referring now to FIG. 11, another embodiment of a multiple speed transmission is generally indicated by reference number 700. The transmission 700 includes an input shaft or member 712 and an output gear or member 714. The input member 712 is continuously connected with an engine (not shown) or other torque producing machine to provide a driving torque to input member 712. The output member 714 rotatably drives a final drive assembly 716. More specifically, the final drive assembly 716 includes a differential gear set coupled to and supported in a differential housing 717. Differential housing 717 is coupled to and is rotatably driven by output member 714. Further, differential housing 717 transfers torque delivered by output member 714 to the differential gear set that is rotatably coupled to first and second side axles 718, 719, and on to road wheels (not shown) coupled to side axles 718, 719.

The transmission 700 includes a gearing arrangement 720 that is at least partially enclosed by a housing 721. The housing 721 includes end walls 723 and 725. End wall 723 is located on a front or side of the transmission 700 proximate a dual clutch assembly 732 and end wall 725 is located on an opposite side of the transmission housing 721 than end wall 723. As in the embodiment described above, the gearing arrangement 720 of transmission 700 includes a first transmission input shaft or member 722, a second transmission input shaft or member 724, a first countershaft 728 and a second countershaft 730. The second shaft or member 724 is a sleeve shaft that is concentric with and overlies the first shaft or member 722. The first and second countershafts 728, 730 are each spaced apart from and parallel with the first and second shaft members 722, 724. The first and second shafts 722, 724 define a first axis of rotation, the first countershaft 728 defines a second axis of rotation and the second countershaft 730 defines a third axis of rotation.

A dual clutch assembly 732 is connectable between the input member 712 and the first and second shaft members 722, 724. The dual clutch assembly 732 includes a clutch housing 734 connectable for common rotation with the input member 712. Further, the dual clutch assembly 732 has first and second clutch elements or hubs 736 and 738. Clutch elements 736 and 738 together with the clutch housing 734 are configured to form a friction clutch, as is known in the art as a dual clutch. More specifically, clutch elements 736, 738 and the clutch housing 734 have friction plates mounted thereon or otherwise coupled thereto that interact to form a friction clutch. The clutch element 736 is connected for common rotation with the first shaft or member 722 and the clutch element 738 is connected for common rotation with the second shaft or member 724. Thus, selective engagement of clutch element 736 with the clutch housing 734 connects the input member 712 for common rotation with the first shaft member 722. Selective engagement of clutch element 738 with the clutch housing 734 connects the input member 712 for common rotation with the second shaft member 724.

The gearing arrangement 720 also includes a plurality of co-planar, intermeshing gear sets 740, 750, 760, and 770. Co-planar gear set 740 includes gear 742, gear 744, and gear 746. Gear 742 is rotatably fixed and connected for common rotation with the second shaft 724 and intermeshes with gear 744. Gear 744 is selectively connectable for common rotation with the first countershaft member 728 and intermeshes with gear 746. Gear 746 is selectively connectable for common rotation with the second countershaft member 730. Gear set 740 is disposed adjacent the end wall 723.

Co-planar gear set 750 includes gear 752 and gear 754. Gear 752 is rotatably fixed and connected for common rotation with the second shaft member 724 and intermeshes with gear 754. Gear 754 is selectively connectable for common rotation with the first countershaft 728. Gear set 750 is positioned adjacent gear set 740.

Co-planar gear set 760 includes gear 762, gear 764, and gear 766. Gear 762 is rotatably fixed and connected for common rotation with the first shaft member 722 and intermeshes with gear 764 and gear 766. Gear 764 is selectively connectable for common rotation with the first countershaft 728. Gear 766 is selectively connectable for common rotation with the second countershaft 730. Gear set 760 is disposed adjacent gear set 750.

Co-planar gear set 770 includes gear 772 and gear 774. Gear 772 is rotatably fixed and connected for common rotation with the first shaft 722 and intermeshes with gear 774. Gear 774 is selectively connectable for common rotation with the first countershaft member 728. Gear set 770 is located between gear set 760 and end wall 725. It should be noted that gear sets 740, 750, 760, and 770 can be rearranged in sequence and not deviate from the intent of the invention.

Further, a first countershaft transfer gear 795 is rotatably fixed and connected for common rotation with the first countershaft member 728. A second countershaft transfer gear 797 is rotatably fixed and connected for common rotation with the second countershaft member 730. First countershaft transfer gear 795 is configured to mesh with output member 714 and the second countershaft transfer gear 797 is configured to mesh with output member 714. However, the first countershaft transfer gear 795 and the second countershaft transfer gear 797 do not mesh with each other. The first countershaft transfer gear 795 is disposed between gear 744 and end wall 723 of the transmission housing 721. The second countershaft transfer gear 797 is disposed between gear 746 and end wall 723 of the transmission housing 721. The output member 714 is co-planar with first and second countershaft transfer gears 795, 797 and positioned between the gear set 740 and end wall 723 of the transmission housing 721.

The transmission 700 further includes a plurality of selectively actuatable synchronizer assemblies 799A, 799B, 799C, and 799D. Synchronizers 799C and 799D are single sided synchronizers that generally include a shift fork (not shown) that is bi-directionally translated by an actuator (not shown) into either an engaged position or a neutral or disengaged position. In the present embodiment, synchronizer 799C is selectively actuatable to connect gear 746 for common rotation with the second countershaft 730 and synchronizer 799D is selectively actuatable to connect gear 766 for common rotation with the second countershaft 730. Synchronizers 799A and 799B are double sided synchronizers and generally include a shift fork (not shown) that is bi-directionally translated by an actuator (not shown) into at least two engaged positions and a neutral or disengaged position. In the present embodiment, synchronizer 799A is selectively actuatable to connect for common rotation gear 744 with the first countershaft 728 and is selectively actuatable to connect for common rotation gear 754 with the first countershaft 728. In the present embodiment, synchronizer 799B is selectively actuatable to connect for common rotation gear 764 with the first countershaft 728 and is selectively actuatable to connect for common rotation gear 774 with the first countershaft 728.

The transmission 700 is capable of transmitting torque from the input shaft 712 to the output member 714 in at least five forward torque ratios and at least one reverse torque ratio. Each of the forward torque ratios and the reverse torque ratio is attained by selective engagement of the dual clutch assembly 732 and one or more of the synchronizer assemblies 799A-D. Those skilled in the art will readily understand that a different speed ratio is associated with each torque ratio.

It should be appreciated that each individual gear set 740, 750, 760, and 770 provides one or more forward and/or reverse gear ratios upon selective engagement of the synchronizer assemblies 799A-D. However, which synchronizer and which gear set are associated with a particular forward or reverse speed ratio may vary without departing from the scope of the present invention.

For example, to establish the reverse torque ratio, clutch element 738 is engaged to couple the input member 712 with the second shaft 724 and synchronizer 799C is engaged to connect gear 746 to the second countershaft 730. More specifically, input torque from the input shaft 712 is transferred through the dual clutch assembly 732 to the second shaft 724, through gear 742 to gear 744, through gear 744 to gear 746, from gear 746 to synchronizer 799C, from synchronizer 799C to second countershaft 730, from second countershaft 730 to transfer gear 797, from transfer gear 797 to output gear 714 and from output gear 714 to differential housing 717 of final drive assembly 716.

To establish a first forward torque ratio (i.e. a 1st gear), clutch element 736 is engaged to couple the input member 712 with the first shaft member 722 and synchronizer 799B is activated to couple gear 774 to the first countershaft 728. Input torque from the input member 712 is transferred through the dual clutch assembly 732 to the first shaft member 722 to gear 772. Gear 772 transfers torque to gear 774 which transfers the torque to the first countershaft 728 through synchronizer 799B, from the first countershaft 728 to transfer gear 795, from transfer gear 795 to output gear 714, and from output gear 714 to differential housing 717 of final drive assembly 716.

To establish a second forward torque ratio (i.e. a 2nd gear), clutch element 738 is engaged to couple the input member 712 to the second shaft 724 which rotates gear 742 and synchronizer 799A is activated to couple gear 744 to the first countershaft member 728. Accordingly, input torque from the input member 712 is transferred through the dual clutch assembly 732 to the second shaft member 724 to gear 742. Gear 742 transfers torque to gear 744 which transfers the torque to the first countershaft 728 through synchronizer 799A, from the first countershaft 728 to transfer gear 795, from transfer gear 795 to output gear 714 and from output gear 714 to differential housing 717 of final drive assembly 716.

To establish a third forward torque ratio (i.e. a 3rd gear), clutch element 736 is engaged to couple the input member 712 to the first shaft 722 which rotates gear 762 and synchronizer 799D is engaged to couple gear 766 to the second countershaft 730. Accordingly, input torque from the input member 712 is transferred through the dual clutch assembly 732 to the first shaft 722 to gear 762. Gear 762 transfers torque to gear 766 which transfers the torque to the second countershaft 730 through synchronizer 799D, from the second countershaft 730 to transfer gear 797, from transfer gear 797 to output gear 714 and from output gear 714 to differential housing 717 of final drive assembly 716.

To establish a fourth forward torque ratio (i.e. a 4th gear), clutch element 738 is engaged to couple the input member 712 to the second shaft member 724 which rotates gear 752 and synchronizer 799A is activated to couple gear 754 to the first countershaft 728. Thus, input torque from the input member 712 is transferred through the dual clutch assembly 732 to the second shaft 724 to gear 752. Gear 752 transfers torque to gear 754 which transfers the torque to the first countershaft 728 through synchronizer 799A, from the first countershaft 728 to transfer gear 795, from transfer gear 795 to output gear 714 and from output gear 714 to differential housing 717 of final drive assembly 716.

To establish a fifth forward torque ratio (i.e. a 5th gear), clutch element 736 is engaged to couple the input member 712 to the first shaft 722 which rotates gear 762 and synchronizer 799B is activated to couple gear 764 to the first countershaft 728. Thus, input torque from the input member 712 is transferred through the dual clutch assembly 732 to the first shaft 722 to gear 762. Gear 762 transfers torque to gear 764 which transfers the torque to the first countershaft 728 through synchronizer 799B, from the first countershaft 728 to transfer gear 795, from transfer gear 795 to output gear 714 and from output gear 714 to differential housing 717 of final drive assembly 716.

Again, it should be appreciated that any one of the gear sets 740, 750, 760, and 770 may be changed to produce a certain forward and reverse torque ratio without departing from the scope of the present invention.

The present invention contemplates that a variety of torque ratios (i.e., the ratio of torque of the output member 714 to the input member 712) are achievable through the selection of tooth counts of the gears of the transmission 700. This arrangement provides the opportunity to achieve reduced transmission length in comparison with other transmissions.

Figure 12:
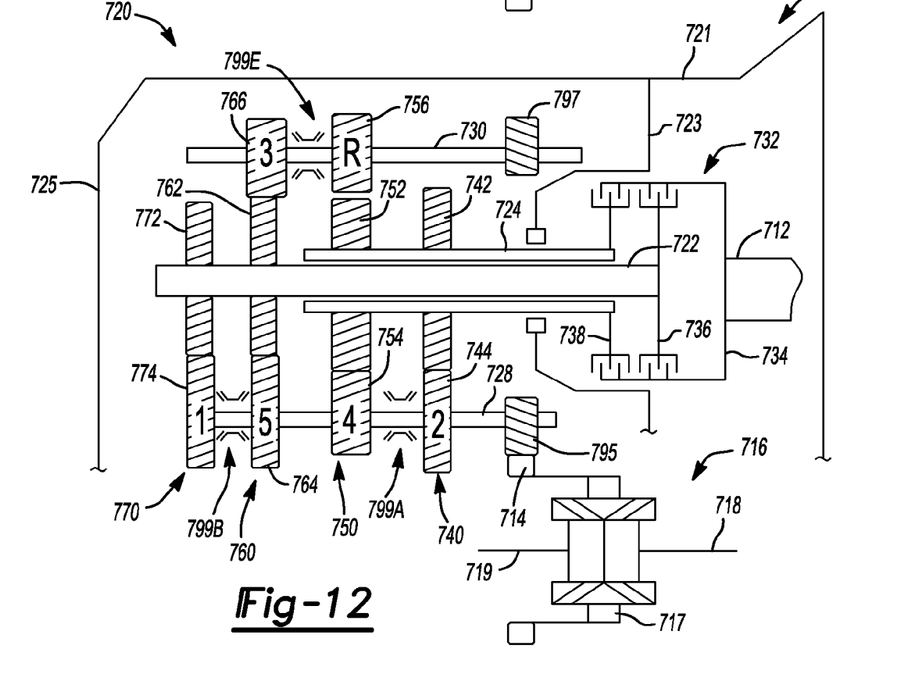
FIG. 12 is a schematic diagram of an embodiment of the five speed transmission of FIG. 11 illustrating alternate synchronizer and gear set locations, in accordance with the present invention.

Turning to FIG. 12, an embodiment of a multiple speed transmission is generally indicated by reference number 700'. The transmission 700' is substantially similar to transmission 700, and accordingly like components are indicated by like reference numbers. However, gear 746 in transmission 700 is replaced by a gear 756 in transmission 700'.ABr 756 is selectively connectable to the second countershaft 730 and intermeshes with gear 754. In addition, one-way synchronizers 799C and 799D have been replaced by a two-way synchronizer, indicated by reference number 799E. Synchronizer 799E is selectively actuatable to connect for common rotation gear 756 with the second countershaft 730 and is selectively actuatable to connect for common rotation gear 766 with the second countershaft 530.

While the best modes for carrying out the invention have been described in detail, those familiar with the art to which this invention relates will recognize various alternative designs and embodiments for practicing the invention within the scope of the appended claims.

The following is claimed:

1. A transmission comprising:
   a transmission housing;
   a dual clutch assembly having a clutch housing connectable to a flywheel of an engine, wherein the clutch housing is rotationally supported within the transmission housing;
   a first, second, third, fourth, and fifth gear sets, wherein the first gear set includes a first gear, a second gear and a third gear, wherein the first gear is in mesh with the second gear and the second gear is operable to transfer torque to the third gear, the second gear set includes a first gear in mesh with a second gear, the third gear set includes a first gear in mesh with a second gear, the fourth gear set includes a first gear in mesh with a second gear, and the fifth gear set includes a first gear in mesh with a second gear;
   a first transmission input member rotatably supported in the transmission housing and wherein each of the first gear of the third, fourth, and fifth gear sets are rotatably and directly fixed for permanent, common rotation with the first transmission input member;
   a second transmission input member rotatably supported in the transmission housing, wherein the first gear of the first and second gear sets are rotatably and directly fixed for permanent, common rotation with the second transmission input member and wherein the second transmission input member is concentric with the first transmission input member and at least partially surrounds the first transmission input member;
   a first countershaft rotatably supported within the transmission housing and spaced apart from and parallel with the first and second transmission input members, wherein the second gear of the first gear set is selectively connectable for common rotation with the first countershaft and the second gear of the third gear set is selectively connectable for common rotation with the first countershaft;
   a second countershaft rotatably supported within the transmission housing and spaced apart from and parallel with the first and second transmission input members, wherein the third gear of the first gear set is selectively engageable with the second countershaft, and the second gears of the second, fourth, and fifth gear sets are each selectively connectable for common rotation with the second countershaft;
   a first transfer gear rotatably and directly fixed for permanent, common rotation to the first countershaft;
   a second transfer gear rotatably and directly fixed for permanent, common rotation to the second countershaft;
   an output gear in mesh with both the first transfer gear and the second transfer gear;
   a first double sided synchronizer assembly that selectively connects the second gear of the fourth gear set and the second gear of the fifth gear set to the second countershaft;
   a second double sided synchronizer assembly that selectively connects the second gear of the second gear set and the third gear of the first gear set to the second countershaft;
   a third single sided synchronizer assembly that selectively connects the second gear of the third gear set to the first countershaft;
   a fourth single sided synchronizer assembly that selectively connects the second gear of the first gear set to the first countershaft, and
   wherein the selective engagement of the dual clutch assembly interconnects the dual clutch housing with at least one of the first and the second transmission input members and the selective engagement of at least one of the four synchronizer assemblies establishes one of five forward speed ratios and one reverse speed ratio.

2. The transmission of claim 1 wherein the first gear set provides a second forward speed ratio and a reverse speed ratio, the second gear set provides a fourth forward speed ratio, the third gear set provides a fifth forward speed ratio, the fourth gear set provides a third forward speed ratio, and the fifth gear set provides a first forward speed ratio.

3. The transmission of claim 2 wherein the first gear set is adjacent the dual clutch assembly, the second gear set is adjacent the first gear set, the third gear set is adjacent the second gear set, the fourth gear set is adjacent the third gear set, and the fifth gear set is adjacent the fourth gear set.

4. The transmission of claim 1 wherein the second gear of the first gear set is in mesh with the third gear of the first gear set.

5. The transmission of claim 1 wherein the output gear is non-coaxial with the first transmission input member, the second transmission input member, the first countershaft, and the second countershaft.

* * * * *